United States Patent
Lin

(10) Patent No.: US 7,222,975 B2
(45) Date of Patent: May 29, 2007

(54) DUAL LAMP ILLUMINATION SYSTEM

(75) Inventor: Ming-Kuen Lin, Taisi Township, Yunlin County (TW)

(73) Assignee: Benq Corporation, Taoyuan Shien (TW)

( * ) Notice: Subject to any disclaimer, the term of this patent is extended or adjusted under 35 U.S.C. 154(b) by 192 days.

(21) Appl. No.: 11/029,625

(22) Filed: Jan. 6, 2005

(65) Prior Publication Data

US 2006/0146296 A1    Jul. 6, 2006

(51) Int. Cl.
*G03B 21/26* (2006.01)
*G33B 21/28* (2006.01)

(52) U.S. Cl. .......................... 353/94; 353/99

(58) Field of Classification Search ............ 353/81, 353/94, 98, 99; 362/227, 234, 236, 241
See application file for complete search history.

(56) References Cited

U.S. PATENT DOCUMENTS 6,505,939 B1 *   1/2003   Bierhuizen et al. .......... 353/94
7,090,357 B2 *   8/2006   Magarill et al. .............. 353/94
7,101,049 B2 *   9/2006   Shindoh ....................... 353/81

* cited by examiner

*Primary Examiner*—Rodney Fuller
(74) *Attorney, Agent, or Firm*—Rabin & Berdo, P.C.

(57) ABSTRACT

A dual lamp illumination system adapted for a projection display system. The dual lamp illumination system includes a first illumination module and a second illumination module, a beam deflecting unit, and a light homogenizer. The first and the second illumination modules each includes a light source, and an elliptically-shaped housing having an interior reflective coating. The light sources each generates an optical beam comprising converging optical rays such that optical beams each has an angular distribution range of [−P, +Q] degrees, where P and Q are preferably 30. The beam deflecting unit reflects at least one of the optical beams from the first and the second illumination module and couples the optical beams to form a multiplexed beam. The light homogenizer is then for homogenizing the multiplexed beam. The invention achieves throughput of 1.5×–1.7× higher gain than single lamp illumination systems useful particularly in a projection display system.

20 Claims, 10 Drawing Sheets

| Example | Angular distribution of illumination module | Apex angle of Prism | Biggest Angle |
|---|---|---|---|
| 1 | [-10,10] | 90 | 0+10 |
| 2 | [-10,10] | 100 | 10+10 |
| 3 | [-10,10] | 105 | 15+10 |
| 4 | [-10,10] | 110 | 20+10 |
| 5 | [-13.42,13.42] | 90 | 0+13.42 |
| 6 | [-13.42,13.42] | 105 | 15+13.42 |
| 7 | [-20,20] | 90 | 0+20 |
| 8 | [-20,20] | 100 | 10+20 |
| 9 | [-20,20] | 105 | 15+20 |
| 10 | [-15,15] | 90 | 0+15 |
| 11 | [-15,15] | 105 | 15+15 |

DUAL LAMP ILLUMINATION SYSTEM

BACKGROUND OF THE INVENTION

1. Field of the Invention

The invention relates in general to an illumination systems, and more particularly to a dual lamp illumination system.

2. Description of the Related Art

Projection systems are widely used in various applications. In a conventional projection system, an arc lamp is used for generating an optical beam. The optical beam, through the color wheel, is then filtered into red, green and blue components. The filtered optical beam is in turn directed towards a light pipe, for modifying the distribution of the optical beam and making the light intensity distribution more uniform.

The optical beam from the light pipe is then relayed by relay optics, such as condensing lens and mirrors, to a digital micro-mirror device (DMD). The DMD includes a number of micro mirrors that can be arranged to either selectively reflect the optical beam towards projection lens to produce image light, or block the optical beam from getting through the projection lens. The optical beam from the projection lens is then projected onto the display screen, thereby displaying an image.

However, the arc lamps used by the conventional projection system often cannot be scaled up to high enough power levels. That is, low lumens level causes the image projected on display screen to appear dark. Due to such inherent drawbacks, methods for increasing power levels have thus been an important topic.

SUMMARY OF THE INVENTION

It is therefore an object of the invention to provide a dual lamp illumination system, adapted for a projection display system, that has high throughput. Therefore, the display screen can receive higher power level to display brighter image.

The invention achieves the above-identified object by providing a dual lamp illumination system adapted for a projection display system. The dual lamp illumination system includes a first illumination module and a second illumination module, a beam deflecting unit, and a light homogenizer. The first and the second illumination modules each includes a light source, and an elliptically-shaped housing having an interior reflective coating. The light sources each generates an optical beam comprising converging optical rays such that optical beams each has an angular distribution range of [−P, +Q] degrees, where P and Q are preferably 30. The beam deflecting unit is positioned on the paths of the optical beams of the first illumination module and the second illumination module. The beam deflecting unit reflects at least one of the optical beams from the first illumination module and the second illumination module and couples the optical beams from the first illumination module and the second illumination module to form a multiplexed beam. The light homogenizer is then for homogenizing the multiplexed beam.

The first illumination module and the second illumination module each further includes a beam expander, for reducing the angular distribution range of the optical beams generated by the light sources of the first illumination module and the second illumination module to substantially no less than [−P/3, Q/3] degrees and substantially no greater than [−2P/3, 2Q/3] degrees. The light sources of the first illumination module and the second illumination module are preferably implemented with arc lamps and back mirror lamps. The system further includes a beam condenser, for receiving the multiplexed beam from the beam deflecting unit before the multiplexed beam enters the light homogenizer.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2 illustrates the simulation results with the optical beams OB1 and OB2 varying in angular distributions.

DETAILED DESCRIPTION OF THE INVENTION

Embodiment 1

Figure 1:
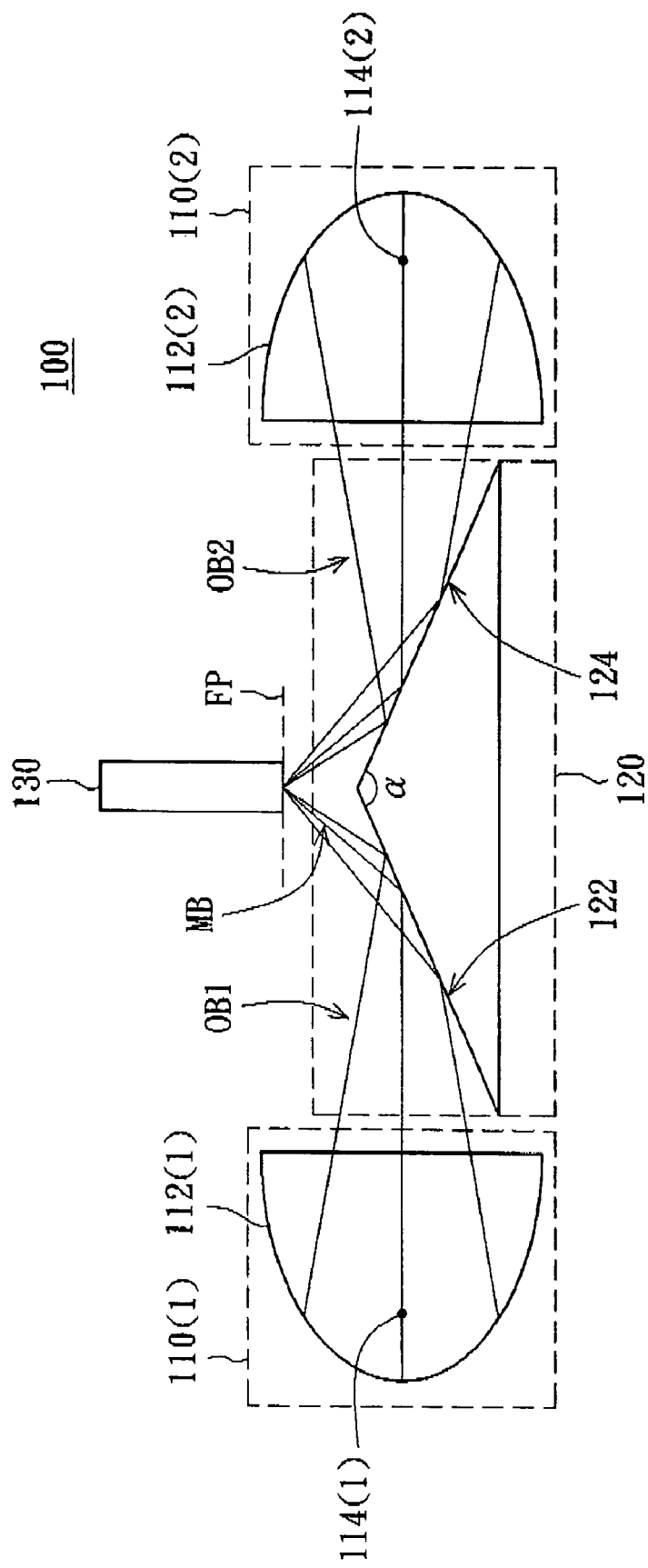
FIG. 1 shows a dual lamp illumination system according to a first embodiment of the invention.

FIG. 1 shows a dual lamp illumination system according to a first embodiment of the invention. The dual lamp illumination system 100 is adapted for a projection display system, and includes a first illumination module 110(1) and a second illumination module 110(2), a beam deflecting unit 120, and a light homogenizer 130. The first and second illumination modules 110(1) and 110(2) face left and right sides of the beam deflecting unit 120. The first and second illumination modules 110(1) and 110(2) include light sources 114(1) and 114(2), and elliptically shaped housings 112(1) and 112(2) having interior reflective coatings, respectively. The light sources 114(1) and 114(2) are respectively for generating optical beams OB1 and OB2, which include converging optical rays. The produced optical beams OB1 and OB2 then propagate towards the beam deflecting unit 120 with each optical beam having an angular distribution range of [−P, +Q] degrees, where P, Q are real numbers. The beam deflecting unit 120, positioned on the paths of the optical beams OB1 and OB2 of the first illumination module 110(1) and the second illumination module 110(2), respectively, is for directing the respective optical beams OB1 and OB2 from the light sources 114(1) and 114(2) towards the light homogenizer 130. The directed optical beams converge at a focal plane FP, referred to as being at a "near field" (vs. a "far field" as referred to beams focused on the projection screen of a projection display system). Preferably, the focal plane FP is at the entrance of the light homogenizer 130. The directed optical beams are coupled to form a multiplexed beam MB.

The light homogenizer 130, preferably a rectangular light tunnel, then homogenizes the multiplexed beam MB, and adjusts the light intensity distribution of the multiplexed beam. That is, due to the nature of the housings 112(1) and 112(2) of the illumination modules being elliptically shaped, the light intensity distributions of the optical beams OB1 and OB2 thus generated are circular. Hence, the light homogenizer 130, in addition to homogenizing optical beams, is used to convert the circular light intensity distribution into a rectangular light intensity distribution, such that when the dual illumination system 100 is adapted in a projection system, the optical beams OB1 and OB2 produced by light sources 114(1) and 114(2) can ultimately be relayed onto a panel of the DMD, which is often rectangular in shape.

The light sources 114(1) and 114(2) of the first and second illumination modules 110(1) and 110(2) are implemented with back mirror lamps, for example. The back mirror lamp is an arc lamp with reflecting coating on front side of a burner of the arc lamp. The angular distribution of the back mirror lamp is about 15 degree. The first and second illumination modules 110(1) and 110(2) using back mirror lamps generally produce optical beams OB1 and OB2 that have angular distributions [−15, +15] degree. In this case, the value of P and Q are both substantially equal to 15.

Besides, the angular distribution of the optical beams OB1 and OB2 generated by the first and second illumination modules 110(1) and 110(2) are not limited to [−15, +15] degree. The object of the embodiment can be still achieved when the angular distribution of the optical beams OB1 and OB2 generated by the first and second illumination modules 110(1) and 110(2) both have a range of no less than [−10, +10] degree and no greater than [−20, +20] degree.

The beam deflecting unit 120 is a prism, for example. Referring again to FIG. 1, the prism 120 has a first reflective surface 122 and a second reflective surface 124 that are facing the first illumination module 110(1) and the second illumination module 110(2), respectively, for reflecting the optical beams OB1 and OB2 from the first illumination module 110(1) and the second illumination module 110(2) towards the light homogenizer 130 to form the multiplexed beam. The prism 120 has an apex angle a defined by the first reflective surface and the second reflective surface intersecting in a line. The apex angle can be varied substantially from 90° to 110°.

FIG. 2 illustrates the simulation results when several angular distributions of the optical beams OB1 and OB2 from the first and second illumination modules 110(1) and 110(2) and several apex angles of the prism 120 are applied in the dual lamp illumination system 100 of the first embodiment. In the simulation, the angular distribution of the optical beams OB1 and OB2 from the first and second illumination modules 110(1) and 110(2) are both in a range of [−10, 10], [−13.42,13.42], [−20, 20], or [−15, 15] degree. As shown in FIG. 2, the apex angle a of the prism 120 is no less than 90 degrees and no greater than 110 degrees. The apex angle provides a constraint to the angular distribution of the multiplexed beam MB when entering the light homogenizer 130.

Figure 3A:
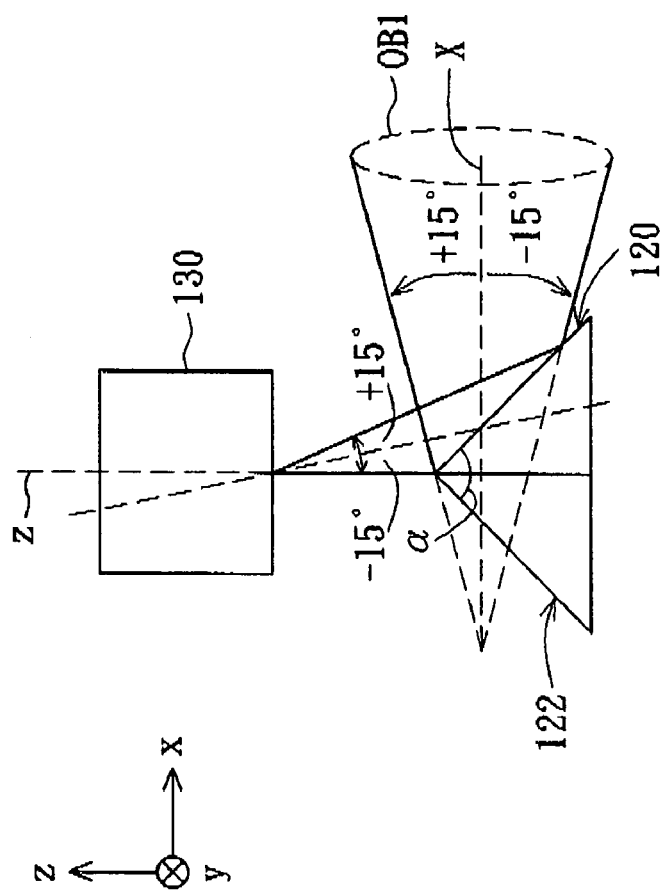
FIGS. 3A and 3B show the effects in two examples when the prism angle and the angular distribution of the multiplexed beam MB are changed.
Figure 3B:
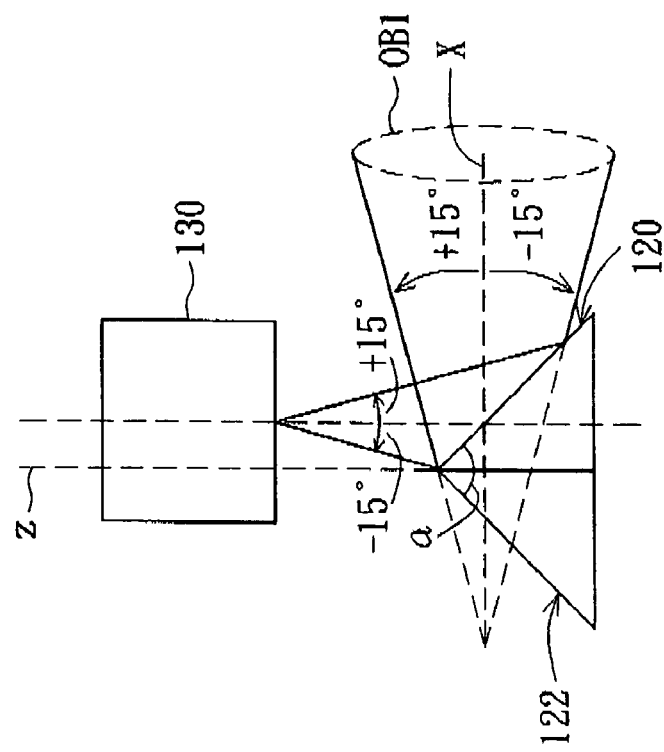

Referring to FIG. 3A, the angular distribution of the multiplexed beam MB is shown when the prism angle is 90° and the angular distribution of the optical beam OB2 from the second illumination module 110(2) is [−15, 15] degree with respect to the X axis (assume the central ray of the optical beam OB2 is parallel to the X axis) (example 10 of FIG. 2). The reflected optical beam entering the light tunnel 130 has an angular distribution range of [−15, 15] with respect to the Z axis (assume the axis of the light tunnel 130 is parallel to the Z axis). Therefore, the biggest angle of ray in reflected optical beam with respect to the Z axis when entering the light tunnel 130 is 15 degree (i.e. 0+15) or −15 degree. Similarly, the biggest angle of ray in reflected optical beam OB2 with respect to the Z axis when entering the light tunnel 130 is also 15 degree or −15 degree. As a result, the angular distribution of the multiplexed beam MB is [−15, 15]. Referring to FIG. 3B, the angular distribution of the multiplexed beam MB is shown when the prism angle is 105° and the angular distribution of the optical beam OB2 from the second illumination module 110(2) is [−15, 15] degree with respect to the X axis (example 11 of FIG. 2). The additional 15°(105°−90°) from the apex angle a contributes to the increase the incident angle of ray in reflected optical beam OB2 with respect to the Z axis by 150 when entering the light tunnel 130. Therefore, the incident angle of rays in reflected optical beam OB2 vary from 0° to 30° with respect to the Z axis, which results that the biggest angle of ray in reflected optical beam OB2 with respect to the Z axis when entering the light tunnel 130 is increased to 30 degree (i.e. 15°+15°). Similarly, the biggest angle of ray in reflected optical beam OB1 with respect to the Z axis when entering the light tunnel 130 is −30 degree. As a result, the angular distribution of the multiplexed beam MB is [−30, 30].

Thus, as demonstrated by the simulation results of FIG. 2, for a dual lamp illumination system 100 when the beam deflecting means is a prism 120, the optical beam OB1, together with the optical beam OB2, can be coupled to form the multiplexed beam MB having a desirable range within the constraint set out by the panel of the DMD ([−30, 30] degree), providing that the prism angle is between 90 and 110 degrees, and the angular distribution range of the optical beams OB1 and OB2 outputted from the first illumination module 110(1) and the second illumination module 110(2) are no less than [−10, 10] and no greater than [−20, 20].

Figure 4:
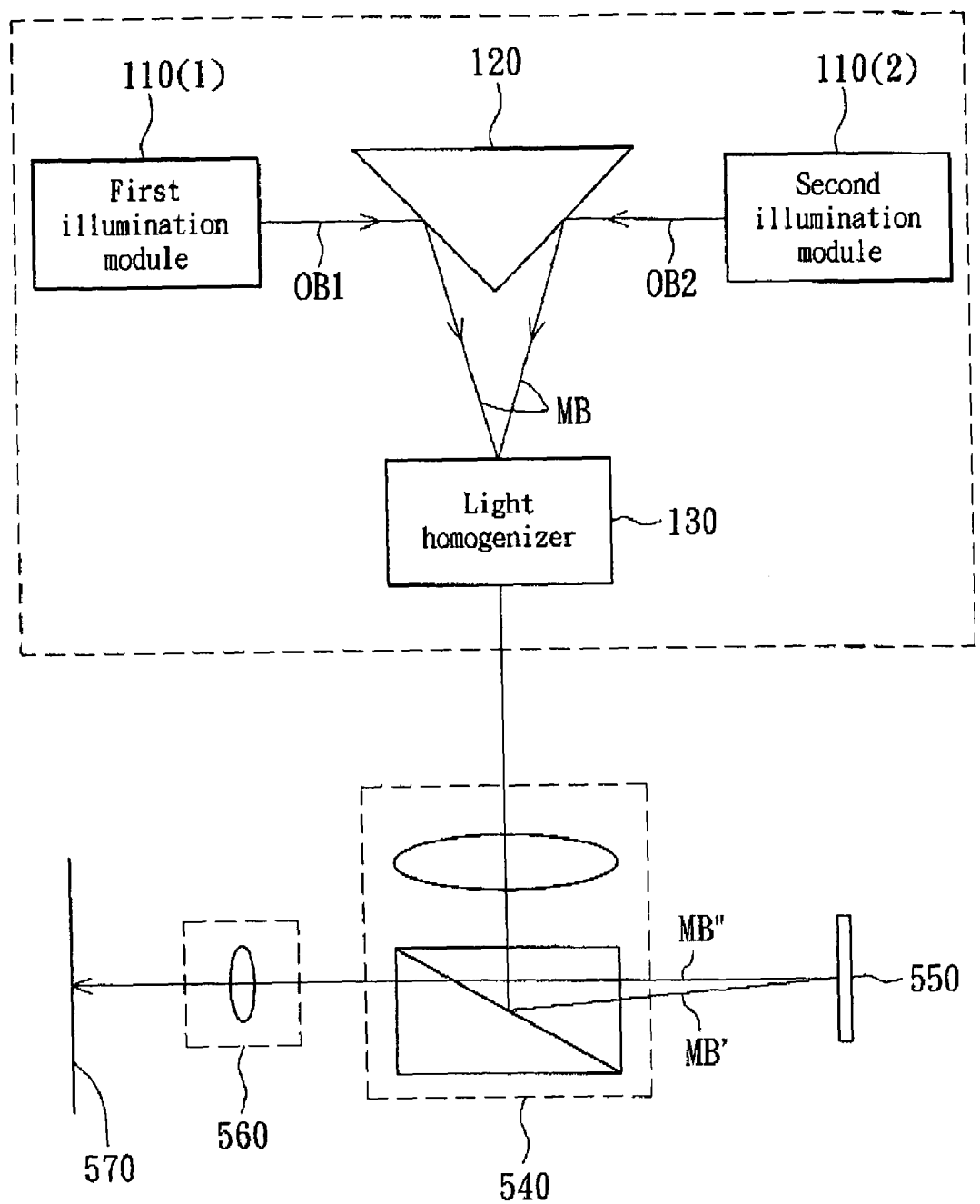
FIG. 4 shows a projection display system 500 incorporating the dual lamp illumination system 100 according to the first embodiment of the invention in FIG. 1.

FIG. 4 shows a projection display system 500 incorporating the dual lamp illumination system 100 according to the first embodiment of the invention in FIG. 1. Projection display system 500 includes a dual lamp illumination system 100, a set of relay optics 540, a light modulator 550, projection lenses 560 and a display screen 570. After the multiplexed beam MB is homogenized by the light homogenizer 130 and converted to a rectangular distribution at the exit of the light homogenizer 130, the relay optics 540, including a condensing lens 540(1) and a TIR prism 540(2), for example, is for relaying the multiplexed beam MB from the light homogenizer 130 to the light modulator 550. The light modulator 550 is a digital micro-mirror device (DMD), for example, and receives the multiplexed beam MB' from the light homogenizer 130 via the relay optics 540. The panel of the DMD 550 is arranged to either selectively reflect the illumination from the multiplexed beam MB' towards the projection lens 560 to produce image light, or block the illumination from getting through the projection lens 560 and onto the display screen 570. After the DMD 550 modulates the multiplexed beam MB' propagating from the light homogenizer 130, the modulated beam MB" reflected by DMD 550 travels again through the relay optics 540 and towards the projection lens 560. The modulated beam MB" is then projected by the projection lens 560 onto the display screen 570, thereby displaying an image.

Figure 5:
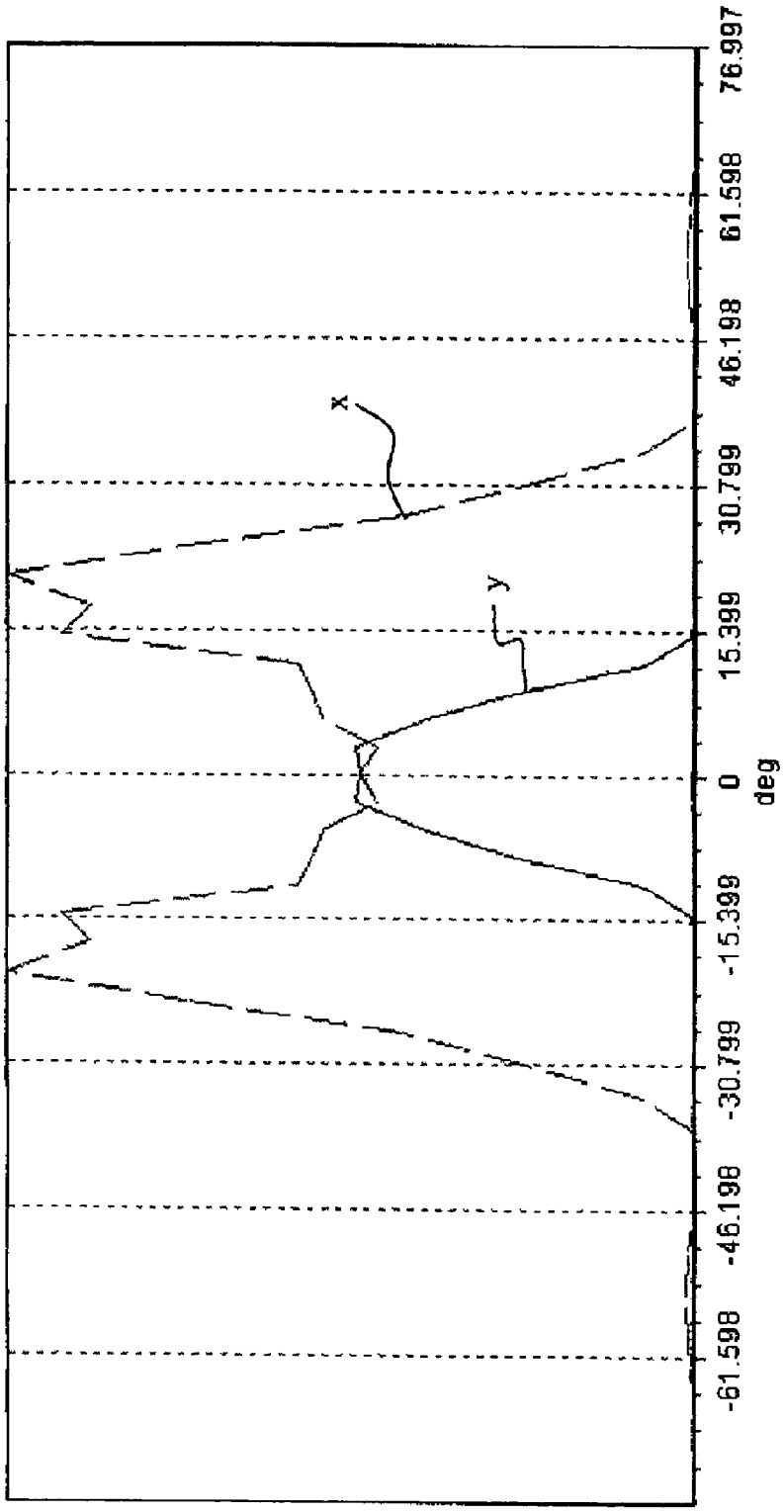
FIG. 5 shows angular distribution of the multiplexed beam MB" of FIG. 4 at the far field.
Figure 6A:
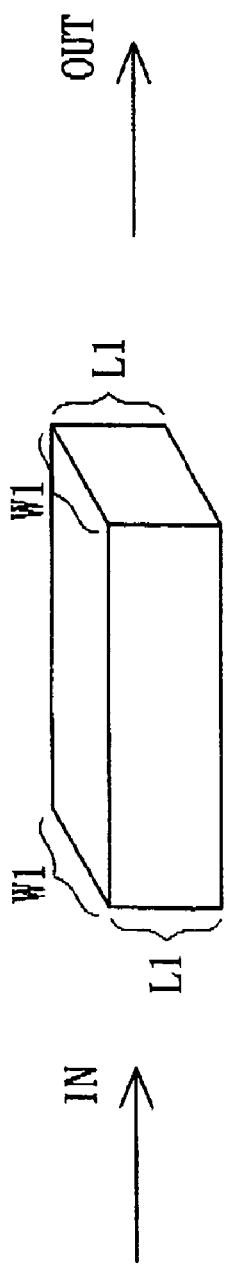
FIGS. 6A and 6B show the dimensions of the rectangular light tunnel and the tapered light tunnel, respectively.
Figure 6B:
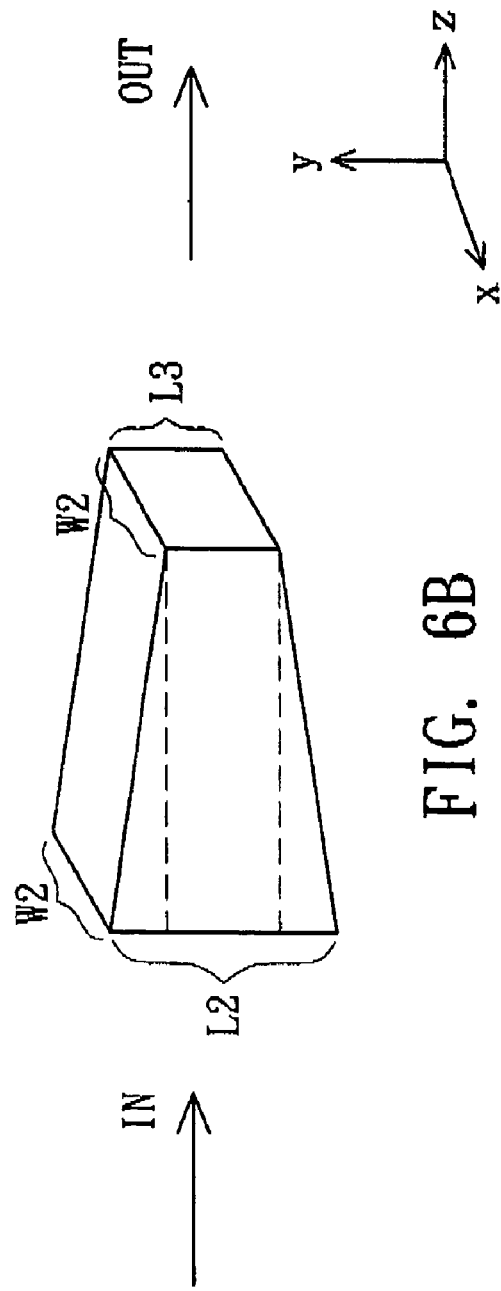

The modulated beam MB" focused on the display screen 570 is referred to as being at the far field. FIG. 5 shows angular distribution of the multiplexed beam MB" of FIG. 4 at the far field when the rectangular light tunnel 130 is applied. The horizontal axis represents the angular distribution in angles, and the vertical axis shows the lumens level of the multiplexed beam MB" in lumens/steradian. The angular distribution of the modulated beam MB" has an angular distribution in the X direction of approximately [−30, +30] degree, and in the Y direction of approximately [−15, +15] degree. The plot illustrates results of when the light tunnel 130 is a rectangular tunnel, in which the width of the entrance is equal to the width of the exit (W1) and the length of the entrance is also equal to the length of the exit the length (L1), as shown in FIG. 6A. In order to increase the angular distribution of the modulated beam MB" in the Y direction from approximately [−15, +15] degree to approximately [−30, +30] degree, the light homogenizer is implemented with a tapered rectangular tunnel, as shown in FIG. 6B. The length (L2) of the entrance of the tapered rectangular tunnel, along the direction (for example, Y direction) perpendicular to the directions of the optical beams OB1 and OB2 and the multiplexed beam MB of FIG. 1, is designed to have substantially twice of the length (L3) of the exit of the tapered rectangular tunnel, as shown in FIG. 6B. However, as long as the length L3 is less than the length L2, the angular distribution of the modulated beam MB" in the Y direction can be increased effectively. For instance, the dimensions of the width W2 and the length L2 of the entrance of the tapered rectangular tunnel can be 8.5 mm by 8.5 mm, and the dimension of the width W2 and the length L3 of the exit of the tapered rectangular tunnel can be 8.5 mm by 6.5 mm for manufacture consideration. Thus, by increasing the length of the entrance of the light homogenizer 130, the angular distribution in Y direction has an increase in angle distribution from [−15°, +15°] to [−30°, +30°].

Embodiment Two

Figure 7:
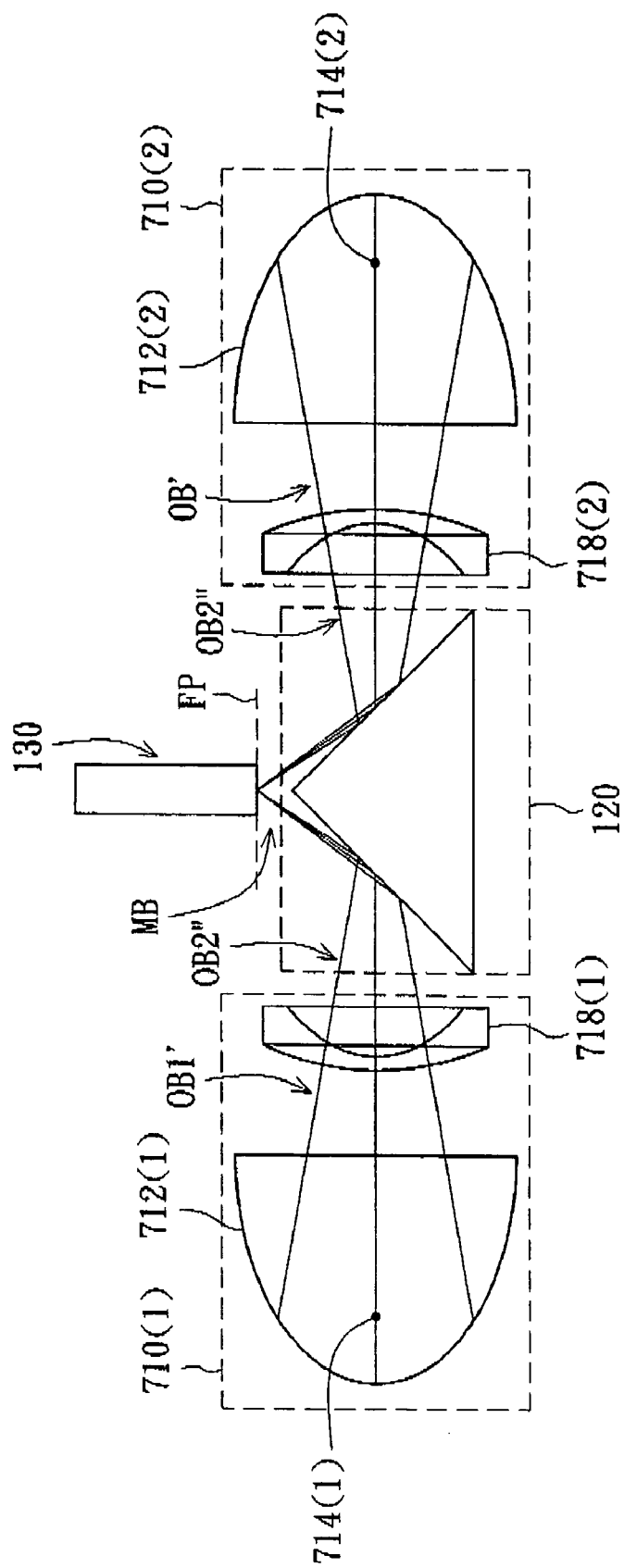
FIG. 7 shows a dual lamp illumination system according to a second embodiment of the invention.

Referring to FIG. 7, a dual lamp illumination system according to a second embodiment of the invention is shown. In FIG. 7, the illumination modules 712(1) and 712(2) can be realized with arc lamps. In the second embodiments utilizing arc lamps, the first and the second illumination module 712(1) and 712(2) further includes expander lenses 718(1) and 718(2), respectively. In typical design consideration of arc lamps, the reflective housings 712(1) and 712(2) are designed such that the optical beams OB1 and OB2 generated by the respective light sources 714(1) and 714(2) have an angular distribution [−P, +Q] degree of [−30+, +30°]. In order to generate the optical beams OB1" and OB2" outputted from the first and the second illumination module 712(1) and 712(2) with [−15°, +15°] angular distribution, the expander lenses 718(1) and 718(2) are placed on the paths of the optical beams OB1' and OB2' propagating from the light sources 214(1) and 214(2) so as to reduce the angular distribution range of the optical beams OB1" and OB2" to no less than [−P/3, Q/3] and no greater than [−2P/3, 2Q/3]. In case when P and Q are equal to 30, the angular distribution of the optical beams OB1" and OB2" is reduced to a range of one-thirds becoming [−10°, 10°] to two-thirds [−20°, 20°], such that when the optical beams OB1" and OB2" are coupled, the resulting multiplexed beam MB" exiting from the light homogenizer 130 will not overfill the panel of the DMD.

Embodiment Three

Figure 8:
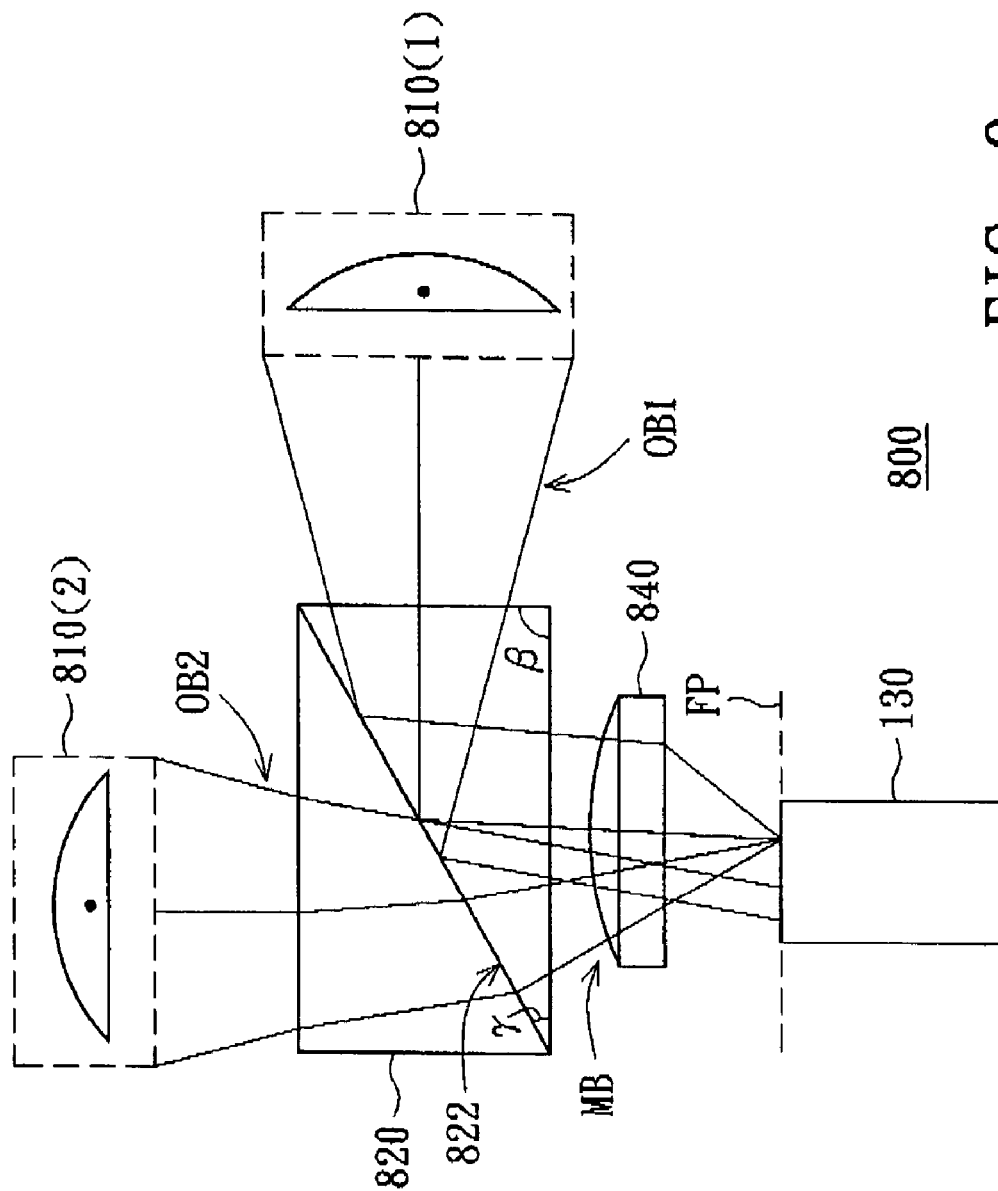
FIG. 8 shows a dual lamp illumination system according to a third embodiment of the invention.
Figure 9:
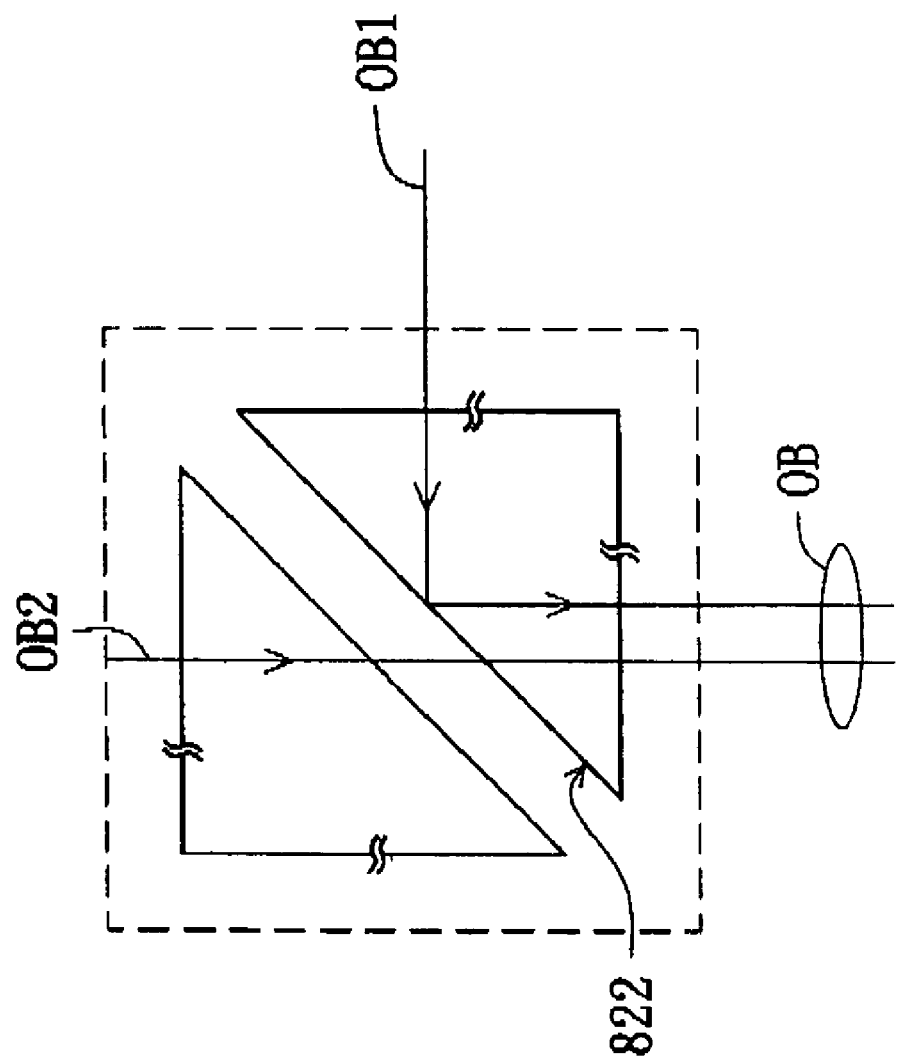
FIG. 9 shows an enlarged view of the prism 820 of FIG. 8.

Referring to FIG. 8, a dual lamp illumination system according to a third embodiment of the invention is shown. FIG. 9 shows an enlarged view of the prism 820. The first and second illumination modules 810(1) and 810(2) face the right side and the front side of the beam deflecting unit, respectively. The first and second illumination modules 810(1) and 810(2) are implemented with back mirror lamps. The beam deflecting means can be realized with a total internal reflection (TIR) prism 820. The propagating directions of the optical beams OB1 and OB2 from the first illumination module 810(1) and 810(2) are substantially perpendicular with respect to each other. A surface 822 of the TIR prism 820 total internally reflects the optical beam OB1 from the first illumination module 810(1) to propagate towards the light homogenizer 130, and the optical beam OB2 from the second illumination module 810(2) propagates towards the light homogenizer 130 by passing through the surface 822. That is, light ray that has an angle of incidence less than the critical angle of the surface 822 of the TIR prism 820 will transmit through the surface 812 rather than total reflected. For effective throughput, the TIR is designed to have an angle β of 99.25° and angle y of 32°, for example. The dual lamp illumination system 800 further includes a beam condenser 840, for converging the multiplexed beam MB from the TIR prism 820 before the multiplexed beam MB enters the light homogenizer 130, thus adjusting the angular distribution of the multiplexed beam MB to have a desired angular distribution, such as of [−30, +30] degree, before the multiplexed beam MB enters the light homogenizer 130.

Preferably, the angular distribution of the optical beams OB1 and OB2 generated by first and second illumination modules 810(1) and 810(2) each has a range of no less than [−10,+10] and no greater than [−20,+20].

Embodiment Four

Figure 10:
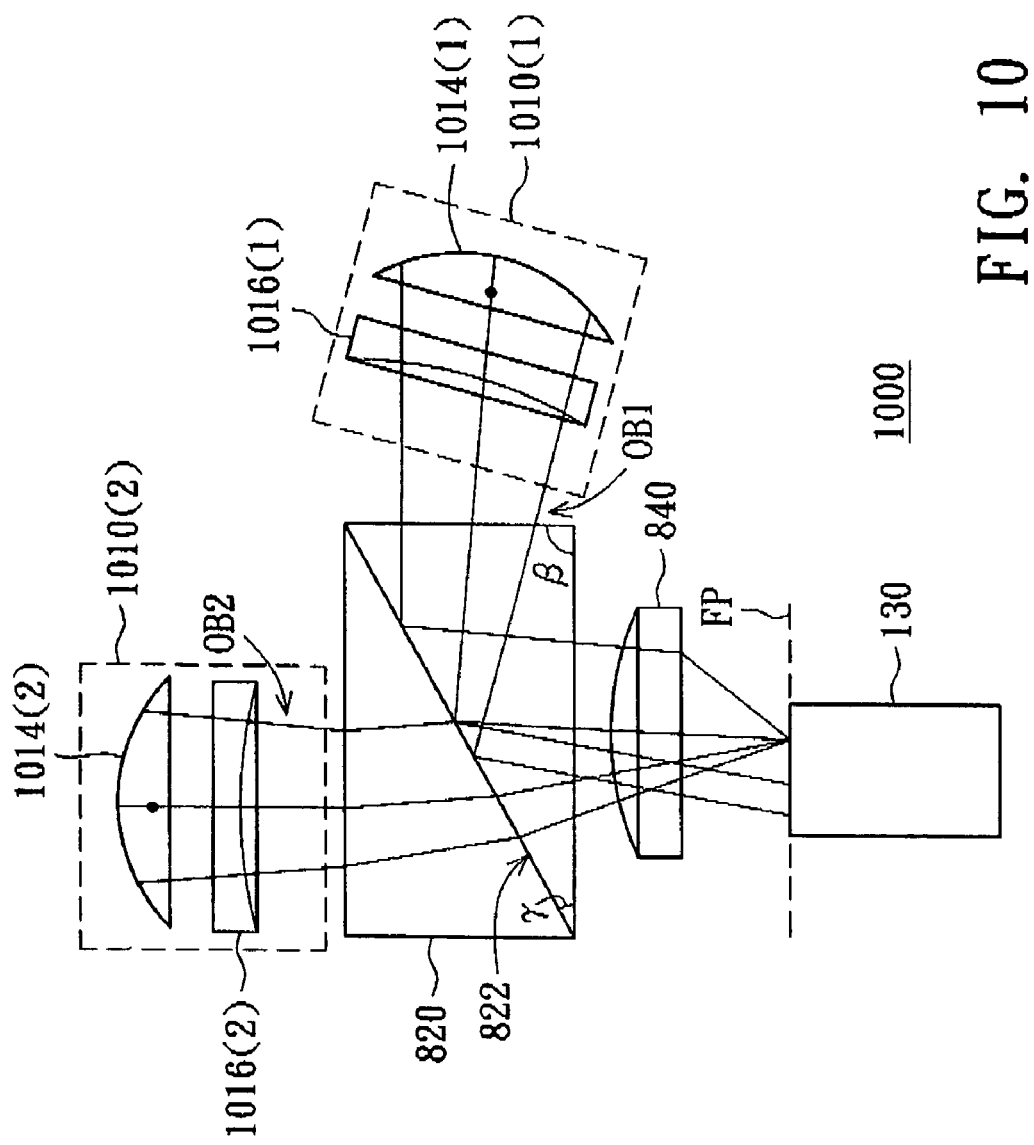
FIG. 10 shows a dual lamp illumination system according to a fourth embodiment of the invention.

Referring to FIG. 10, a dual lamp illumination system according to a fourth embodiment of the invention is shown. In this embodiment, the first and second illumination modules 1010(1) and 1010(2) are implemented with arc lamps 1014(1) and 1014(2). Since arc lamps generally produce optical beams OB1 and 0B2 that have angular distributions [−30, +30], expander lenses 1016(1) and 1016(2) are utilized to decrease the angular distribution from being in a range of [−30, 30]degree to a range of [−15, +15]degree, before the optical beams OB1 and OB2 are focused at the focal plane F at the light homogenizer 230 entrance. The back mirror lamps 810(1) and 810(2) in FIG. 8 can be replaced by the arc lamp 1014(1) and expander lens 1016(1), and arc lamp 1014(2) and expander lens 1016(2), respectively.

Thus, as shown, by utilizing two illumination modules to generate optical beams that couple to form a multiplexed beam that is then relayed onto the panel of the DMD, the resulting throughput has a gain of 1.5 to 1.7 times as compared to single lamp systems. Additionally, by utilizing condenser lenses and expander lenses, the embodiments of the invention effectively prevents the effects of overfill on DMD.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual lamp illumination system, adapted for a projection display system, comprising:
a first illumination module and a second illumination module, each comprising a light source, and an elliptically-shaped housing having an interior reflective coating, the light sources each generating an optical beam comprising converging optical rays, the optical beams each having an angular distribution range of [−P, +Q] degrees, P, Q being real numbers, wherein each of the first illumination module and the second illumination module further comprises a beam expander, for reducing the angular distribution range of the optical beams generated by the light sources of the first illumination module and the second illumination module;

a beam deflecting unit, positioned on the paths of the optical beams of the first illumination module and the second illumination module, wherein the first illumination module and the second illumination module face different sides of the beam deflecting unit, the beam deflecting unit reflects at least one of the optical beams from the first illumination module and the second illumination module and couples the optical beams from the first illumination module and the second illumination module to form a multiplexed beam which converges at a focal point; and a light homogenizer, for homogenizing the multiplexed beam.

2. The system according to claim 1, wherein P and Q are substantially equal to 30, the beam expander reduces the angular distribution range of the optical beams generated by the light sources of the first illumination module and the second illumination module to substantially no less than [−P/3, Q/3] degrees and substantially no greater than [−2P/3, 2Q/3] degrees.

3. The system according to claim 2, wherein the light sources of the first illumination module and the second illumination module are arc lamps.

4. The system according to claim 1, wherein P and Q are substantially no less than 10 and substantially no greater than 20.

5. The system according to claim 4, wherein the light sources of the first illumination module and the second illumination module are back mirror lamps.

6. The system according to claim 5, where P and Q are substantially equal to 15.

7. The system according to claim 1, wherein the a focal point is on a focal plane FP at an entrance of the light homogenizer.

8. The system according to claim 7, wherein the focal point is located at the entrance of the light homogemzer.

9. The system according to claim 1, wherein the beam deflecting unit comprises a prism which comprises a first reflective surface and a second reflective surface, the first reflective surface and the second reflective surface of the prism face the first illumination module and the second illumination module respectively, for reflecting the optical beams from the first illumination module and the second illumination module toward the homogenizer to form the multiplexed beam.

10. The system according to claim 9, wherein the first reflective surface and the second reflective surface intersect in a line to form an apex angle, the apex angle is substantially no less than 90 degrees and substantially no greater than 110 degrees, the angular distribution range of the optical beams from the first illumination module and the second illumination module are both substantially no less than 10 degrees and substantially no greater than 20 degrees.

11. The system according to claim 10, wherein the light homogenizer is a tapered rectangular tunnel, the length, along the direction perpendicular to the directions of the optical beams and the multiplexed beam, of the entrance of the tapered rectangular tunnel is substantially twice of the length of the exit of the tapered rectangular tunnel, and the width of the exit of the tapered rectangular tunnel is substantially the same as the width of the entrance of the tapered rectangular tunnel.

12. The system according to claim 1, wherein the beam deflecting unit comprises a total internal reflection (TIR) prism, the propagating directions of the optical beams from the first illumination module and the second illumination module before the optical beams entering the TIIR prism are substantially perpendicular with respect to each other, a surface of the TIR prism total internally reflects the optical beam from the first illumination module to cause the reflected optical beam to propagate towards the light homogenizer, and the optical beam from the second illumination module passes through the surface and then propagate towards the light homogenizer.

13. The system according to claim 12, wherein the system further comprises a beam condenser, for receiving the multiplexed beam from the beam deflecting unit before the multiplexed beam enters the light homogenizer.

14. The system according to claim 13, wherein the light homogenizer is a rectangular light tunnel.

15. The system according to claim 12, wherein the first illumination module and the second illumination module face a first side and a second side of the beam deflecting unit respectively, the at least one optical beam from the first illumination module is perpendicular to the first side and at least one optical beam from the second illumination module is perpendicular to the second side.

16. The system according to claim 12, wherein the propagating directions of the optical beams from the first illumination module and the second illumination module before the optical beams entering the TIR prism are substantially perpendicular with respect to each other.

17. The system according to claim 12, wherein the TIR prism has a first angle of about 99.25 degrees and a second angle of about 32 degrees.

18. The system according to claim 17, wherein the TIR prism has a third side adjacent to the first side and opposite to the second side, and the third side is longer than the first side.

19. The system according to claim 18, wherein the first angle is included between the third side and the surface.

20. The system according to claim 18, wherein the second angle is included between the third side and the first side.

* * * * *